United States Patent [19]
Sterner et al.

[11] Patent Number: 6,090,433
[45] Date of Patent: Jul. 18, 2000

[54] LEGUMINOUS SNACK FOOD AND PROCESS OF MAKING THE SAME

[76] Inventors: Mark M. Sterner, 1772 Melqua Rd., Roseburg, Oreg. 97470; Mark H. Sterner, 5553 Wentworth Ave., Riverside, Calif. 92505; Ronald S. O. Zane, P.O. Box 40, Norco, Calif. 91760

[21] Appl. No.: 08/059,895

[22] Filed: May 7, 1993

Related U.S. Application Data

[63] Continuation of application No. 07/915,430, Jul. 17, 1992, abandoned.

[51] Int. Cl.⁷ .............................. A23L 1/20; A23L 1/00; A23B 5/00; A23B 4/03
[52] U.S. Cl. .......................... 426/634; 426/309; 426/459; 426/460; 426/461; 426/508
[58] Field of Search ............................. 426/93, 273, 289, 426/309, 634–455, 456, 459, 460, 461, 507, 508, 520, 524

[56] References Cited

U.S. PATENT DOCUMENTS

| | | | |
|---|---|---|---|
| 2,402,675 | 6/1946 | Schaffner | 426/461 |
| 3,291,615 | 12/1966 | Thompson et al. | 426/461 |
| 3,738,848 | 6/1973 | Mader | 426/634 |
| 4,871,567 | 10/1989 | Sterner et al. | 426/634 |

FOREIGN PATENT DOCUMENTS 289060  3/1988  European Pat. Off. .

OTHER PUBLICATIONS

Soybeans and Soybean Products as Food, 1943, U.S. Dept. of Agric. Miscellaneous Publication No. 534.

*Primary Examiner*—Anthony J. Weier
*Attorney, Agent, or Firm*—Stetina Brunda Garred & Brucker

[57] ABSTRACT

A leguminous food product which generally retains the shape of the legume from which it was made is formed from a variety of legumes such as pinto beans, red beans, black beans, navy beans, kidney beans, lentils and peas, etc. The leguminous food product is somewhat crisp and crunchy when chewed. It may be seasoned or flavored with salt, herbs, spices, etc. to achieve a variety of different desired tastes. The leguminous food product provides a nutritional source of protein and fiber which is low in fat and calories. The leguminous food product is formed by preconditioning, cooking, chilling, dehydrating, and enrobing the legumes.

1 Claim, 2 Drawing Sheets

LEGUMINOUS SNACK FOOD AND PROCESS OF MAKING THE SAME

This application is a continuation of application Ser. No. 07/915,430, filed on Jul. 17, 1992 now abandoned.

FIELD OF THE INVENTION

The present invention relates generally to food products. It relates more particularly to a leguminous snack food formed from any one of several varieties of legumes, having the general shape thereof, being somewhat crisp and crunchy when chewed, and being seasoned with salt, and various herbs and spices.

BACKGROUND OF THE INVENTION

Legumes such as peas, lentils, and beans are very well known. Such legumes are commonly used in various food preparations. Legumes are recognized as an important source of nutritional protein and fiber. Additionally they are low in fat and calories. Because they are generally inexpensive, legumes represent a substantial portion of many peoples diets.

A wide variety of contemporary snack foods are popular. However, many of the common snack foods such as potato chips, pretzels, corn chips, etc., contain high levels of fat and calories and are therefore not generally considered to have substantial nutritional value. Thus, it is not generally desirable that substantial quantities of such contemporary snack foods be consumed, particularly by children.

As such, although a variety of such contemporary snack foods are widely consumed, it would be beneficial to provide a snack food having a legume as a principal ingredient thereof such that the nutritional benefits of consuming this healthful product are realized.

SUMMARY OF THE INVENTION

The present invention specifically addresses and alleviates the above mentioned deficiencies associated in the prior art. More particularly, the present invention comprises a leguminous food product which generally retains the shape of the legume from which it was made. It is formed from a variety of legumes such as pinto beans, red beans, black beans, navy beans, kidney beans, lentils, and peas, etc.

The leguminous food product is somewhat crisp and crunchy when chewed. It may be seasoned or flavored with salt, herbs, spices, etc. to achieve a variety of different desired tastes. The leguminous food product provides a nutritional source of protein and fiber which is low in fat and calories. The process of preparing the leguminous snack foods of the present invention generally comprises the steps of preconditioning, cooking, chilling, dehydrating, and enrobing the legumes.

The preconditioning process comprises washing and destoning the legumes, and then soaking them in water until they are either partially or fully hydrated. The degree of hydration occurring during preconditioning determines the heat and time required for cooking. The amount of hydration, if any, is dependent upon the type of legume utilized and/or the subsequent manner of cooking to be employed. Such hydration provides a sufficiently soft and thoroughly cooked snack food. In order to fully hydrate the legumes, they are soaked in water for between 1–24 hours at a temperature of 55–212 degrees fahrenheit. When fully hydrated, the moisture content of the legume will be approximately 50%.

Alternatively, the legumes can be partially hydrated by soaking them in water at temperatures ranging from 85–212 degrees fahrenheit until the desired degree of hydration is obtained.

The purpose of cooking the legumes is to develop their distinctive flavor and to thoroughly soften them throughout. Those skilled in the art will recognize that various cooking methods may be employed to provide a crisp, lightly crunchy snack food. Cooking may be performed while the legumes are submerged in water and boiled at 212 degrees fahrenheit at atmospheric pressure or while submerged in water and boiled at higher temperatures under steam pressure. They may alternatively be cooked in a rotating vessel which provides a pressurized live steam environment. Pressures of 5 psig or more are preferred. When cooked in a live steam environment, only the water of condensation is present. The application of heat is discontinued when the water content of the legumes is at least 50%, by weight.

Regardless of the cooking method employed, the legumes must contain approximately 50% or more water by weight. The legumes will preferably comprise 52–55% water after the cooking process. This assures that they are very soft and easily crushed. Over cooking the legumes will cause them to soften to the point where they no longer have sufficient structural integrity to retain their shape during subsequent processing steps. The chilling process halts the cooking of the legumes.

Chilling is performed by submerging the legumes in cold water until their temperature has dropped to below 90 degrees fahrenheit, preferably to below 60 degrees. During the chilling process, the legumes absorb additional water such that they are preferably between approximately 55–60% water, by weight. The final moisture content of the legumes prior to the dehydration process is important for achieving a desired crisp and lightly crunchy texture.

Cold water is used to chill the legumes to a temperature of less than 90 degrees fahrenheit. During the chilling process the legumes typically absorb an additional 2–4% of water, by weight. After cooling, the legumes are dehydrated by passing hot air thereover until they contain approximately 6–8% water by weight. The legumes may then be enrobed as desired.

Typically, air velocities through a 1 inch thick bed of legumes on the order of approximately 500–515 fpm are utilized in the dehydration process. The temperature and humidity of the air passing through the bed of legumes is determined by the remaining moisture content as the dehydration process progresses. By controlling the temperature and humidity of the air during the dehydration process, a desirable texture of the finished snack product is obtained and "bird mouthing" is avoided.

Bird mouthing is a condition of the legumes wherein the two halves of the legume split along a portion of the length thereof such that the legume begins to open in a manner resembling a partially opened bird mouth.

Thus, the permissible temperature and humidity of the air utilized in the drying process is dictated by the remaining moisture content in the legume. For instance, when legumes contain over 40% moisture, air temperatures up to 235 degrees fahrenheit at 50% relative humidity are permissible. However, as the residual moisture is reduced to below 10%, the temperature must be reduced to approximately 160 degrees fahrenheit and the relative humidity to approximately 10%. The reduction in temperature and humidity avoids the occurrence of a maillard reaction. A maillard reaction results in undesirable browning or toasting of the legumes.

A final residual moisture of between 6–8% in the legume is desired. Lower moisture content generally accelerates oxidation of the natural oils of the legume, while higher moisture content will reduce the desirable crisp and crunchy texture of the snack food. Residual moisture above 12% will support the undesirable growth of mold.

In the enrobing process, flavorings, seasonings, herbs, spices, salt and the like are added. These spices are preferably added after the dehydration process. Powdered legumes may form part of the enrobing material, functioning as a carrier for the seasonings, herbs, spices, salt or the like. The resinous extracts of herbs and spices may be sprayed onto the outside of the legumes in conjunction with cooking the legumes in the presence of seasonings.

These, as well as other advantages of the present invention will be more apparent from the following description and drawings. It is understood that changes in the specific structure shown and described may be made within the scope of the claims without departing from the spirit of the invention.

DETAILED DESCRIPTION OF THE PREFERRED EMBODIMENT

The detailed description set forth below in connection with the appended drawings is intended as a description of the presently preferred embodiment of the invention, and is not intended to represent the only form in which the present invention may be constructed or utilized. The description sets forth the function and sequence of steps for constructing and operating the invention in connection with the illustrated embodiment. It is to be understood, however, that the same or equivalent functions and sequences may be accomplished by different embodiments that are also intended to be encompassed within the spirit and scope of the invention.

The process of preparing the leguminous snack food of the present invention is illustrated in FIGS. 1–4, which depict a presently preferred embodiment of the invention.

Figure 1:
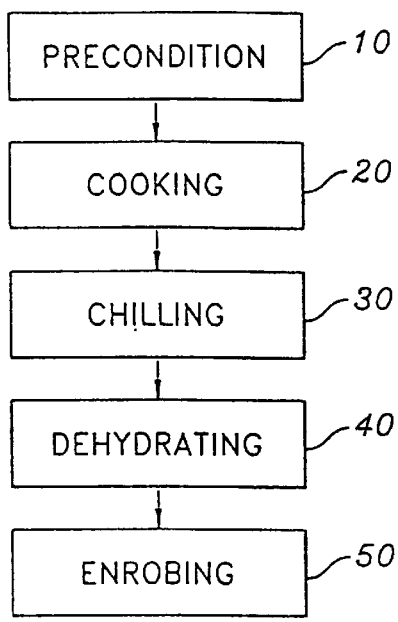
FIG. 1 is a flow chart illustrating an overview of the leguminous snack food preparation process.

Referring now to FIG. 1, the process is comprised generally of preconditioning 10, cooking 20, chilling 30, dehydrating 40, and enrobing 50. Each of these steps is discussed in detail below.

Figure 2:
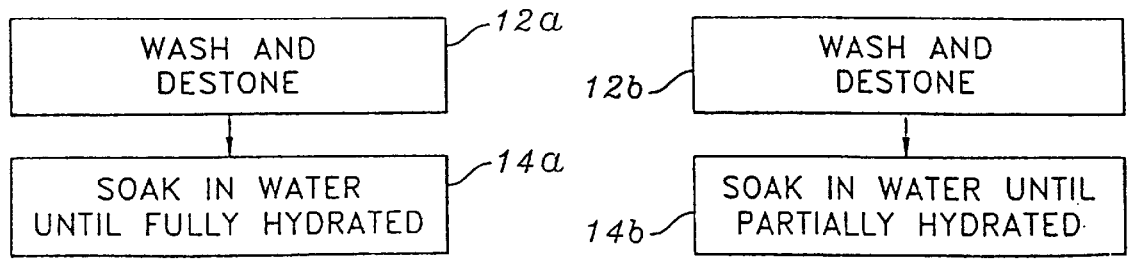
FIG. 2 is a flow chart illustrating two alternative methods of preconditioning the legumes to be utilized in the process of the present invention.

Referring now to FIG. 2, two alternative preconditioning processes are illustrated. Preconditioning refers to the soaking of the legume in water prior to cooking. The degree of preconditioning, if any, is dependent upon the type of legume used and/or the subsequent manner of cooking to be employed. The final snack food must be soft and thoroughly cooked.

In the first alternative preconditioning method, the legumes are first washed and destoned 12a. The washing and destoning step 12a removes contaminants and foreign materials such as dirt, insecticides, small stones and gravel from the legumes.

Next, the legumes are soaked in water until fully hydrated 14a. Thus, the legumes will contain all the water that they can absorb at this time. The legumes will be fully hydrated within approximately 1–24 hours when soaked in water having a temperature of 55–212 degrees fahrenheit. As those skilled in the art will recognize, the precise duration and water temperature will depend upon the type of legume employed and/or the subsequent manner of cooking to be employed. When fully hydrated, the moisture content of the legume will be approximately 50%.

In the second alternative method of preconditioning, the legumes are washed and destoned 12b as in the first alternative, then soaked in water having a temperature ranging from 85–212 degrees fahrenheit for a period of time such that the legumes become partially hydrated. The second alternative preconditioning method requires a longer cooking time. The precise water temperature and preconditioning time is again dependent upon the type of legume utilized in the subsequent manner of cooking to be employed. In general, the lower the hydration of the legumes occurring in the preconditioning process, the longer the subsequent cooking time required.

Figure 3:
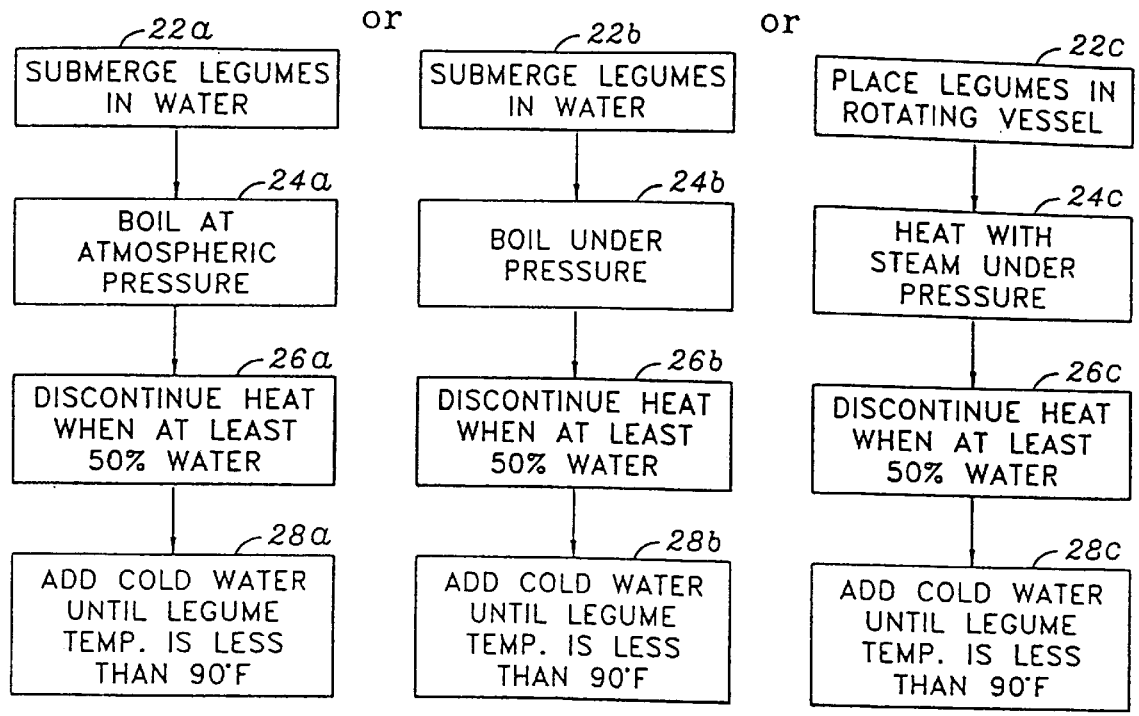
FIG. 3 is a flow chart of 3 alternative processes for cooking and chilling the legumes according to the method of the present invention.

Referring now to FIG. 3, three alternative cooking processes are illustrated. In the first alternative cooking process the legumes are submerged in water 22a and boiled at atmospheric pressure 24a. Heating is discontinued when the legumes are at least 50% water, by weight. After hydration of 50% is attained, the legumes are chilled by adding cold water until the legume temperature is less than 90° fahrenheit 28a.

In the second alternative cooking process, the legumes are submerged in water 22b, and boiled under pressure 24b. The application of heat is discontinued 26b when the legumes are at least 50% water, by weight. The legumes are chilled by adding cold water until the legume temperature is less than 90 degree fahrenheit 28b.

In the third alternative of the cooking process, the legumes are placed in a rotating vessel 22c and heated under steam pressure 24c. Steam pressure of 5 psig or more is preferred. Heating is discontinued 26c when the legumes are at least 50% water, by weight.

The process of cooking develops the distinctive flavor of the legume employed. It additionally causes the legume to soften throughout such that subsequent dehydration will render the legume crisp and lightly crunchy. Improperly cooked legumes will produce an objectionably hard product, possibly having hard particles within.

As those skilled in the art will recognize, various methods of cooking legumes are likewise suitable. As described above, the legumes may be boiled at 212 degrees fahrenheit at atmospheric pressure or alternatively cooked under steam pressure. They may also be cooked in a rotating vessel in a live steam atmosphere at 5 psig or greater. When cooked in a live steam environment, only the water condensation is present.

In any event, at the end of the cooking process, the legumes must contain approximately 50% or more of water. The legumes will preferably contain 52–55% of water by weight, and thus be very soft and easily crushed. Over cooked legumes will no longer have sufficient structural integrity to retain their shape during subsequent processing steps.

The chilling step 28a, 28b, or 28c halts the cooking process. In the chilling step, the legumes are subjected to water having a temperature of 90 degrees or less, preferably 60 degrees fahrenheit or less. The legumes are chilled until their temperature has dropped to below 90 degrees fahrenheit, preferably below 60 degrees fahrenheit. While the legumes are being chilled, they absorb additional water, having a final moisture content of 55–60%, by weight. This final moisture content is essential prior to dehydration to assure that a crisp and lightly crunchy texture is obtained in the final snack food product.

Figure 4:
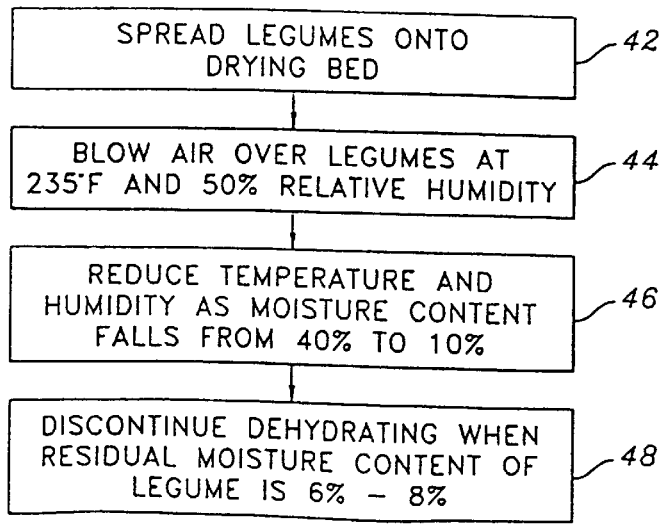
FIG. 4 is a flow chart illustrating the process of dehydrating the legumes according to the method of the present invention.

Referring now to FIG. 4, the dehydrating process is illustrated. First the legumes are spread onto a drying bed 42, then air is blown over the legumes at a temperature of approximately 235 degrees fahrenheit and a humidity of approximately 50% 44. The temperature and humidity are reduced 46 as the moisture content falls from 40% to 10%. The dehydration process is halted when the residual moisture content of the legume reaches approximately 6–8% 48.

Preferably, the legumes are dehydrated in a stream of hot air, typically having a velocity of between 500–1500 fpm for a 1 inch thick bed of legumes. The temperature of the air passing through the bed of legumes is determined by the remaining moisture content in the legume as the dehydration process progresses. For example, when the legumes contain over 40% moisture, air temperatures of up to 235 degrees fahrenheit at 50% relative humidity are generally permissible. However, as the residual moisture is reduced to below 10%, the temperature must typically be reduced to 160 degrees fahrenheit with approximately 10% relative humidity. This reduction in temperature and the corresponding reduction in relative humidity helps to mitigate the problem of incurring a mallard reaction, i.e. browning or toasting.

As mentioned above, a final residual moisture content of between 6–8%, by weight, is desired. Lower moisture content greatly accelerates oxidation of the natural oils while higher moisture content will reduce the desirable texture. Residual moisture content above 12% will support undesirable mold growth.

In the enrobing process 50 (FIG. 1), seasonings, herbs, spices, salt and the like are added, preferably after dehydration. Powdered legumes may be part of the enrobing material as a carrier for the seasonings, herbs, spices, etc. Resinous extracts of herbs and spices may optionally be sprayed onto the outside of the legume in conjunction with cooking the legume in the presence of seasonings.

Having discussed the general processing steps utilized in the preparation of various legumes as a snack food product of the present invention, it may be beneficial to discuss the more specific steps involved in the processing of particular legumes, as follows:

BLACK EYE BEAN

The black eye bean is prepared according to two variations of the preconditioning and cooking steps. In both instances, dehydration is identical. In the first alternative process, whole black eye beans are cooked, destoned, and preconditioned in 60 degree fahrenheit water for 17 hours. After preconditioning, they contain 51% moisture. The black eye beans are drained and placed in a cooking vessel containing enough hot water to cover the beans. They are then boiled at 212 degrees fahrenheit for approximately 90 minutes.

The heat is turned off and cold water introduced into the bottom of the vessel while the hot water flowed over the top. Cooling is continued until the temperature of the legumes is lowered to below 90 degrees fahrenheit. The cooked beans are separated from the water.

The resulting cooked beans are very soft and the integrity of the bean is maintained. The water content is approximately 55%, by weight.

In the second alternative, whole black eye beans are washed, destoned, and preconditioned in 60 degrees fahrenheit water for 17 hours. After preconditioning, they contain 51% moisture. The beans are then drained and placed in a pressure cooker containing enough hot water to cover the beans. The beans are then boiled at 212 degrees fahrenheit at atmospheric pressure for 20 minutes, then the vessel is closed and cooking is continued for 15 minutes at 10 psig.

After 15 minutes, the pressure is released and cold water introduced into the vessel while the hot water is drained off the top. This continues until the beans are below 90 degrees fahrenheit. The cooked beans are separated from the water, these beans are also very soft and contain 55% moisture, by weight. The benefit of utilizing the second alternative is that total cooking time is decreased.

In both instances, the cooked black eye beans are dried under the same conditions. The beans are spread onto a perforated belt to a thickness of approximately 1 inch and an air velocity of approximately 800 fpm is utilized in three stages.

In the first stage, air having a temperature of approximately 225 degrees fahrenheit and a relative humidity of approximately 50% is blown over the drying bed for approximately 65 minutes.

In the second stage, air having a temperature of approximately 200 degrees fahrenheit and a relative humidity of approximately 20% is blown over the drying bed for approximately 40 minutes.

In the third stage, air having a temperature of approximately 160 degrees fahrenheit and a relative humidity of approximately 20% is blown over the drying bed for approximately 50 minutes. After drying, the residual moisture content of the beans is approximately 7%.

The black eye beans are enrobed by adding various different alternative flavorings such as cajun, chili, and bacon by spraying aquaresins onto them as they are mixed. As those skilled in the art will recognized, the aquaresins are derivatives of herbs, spices and natural flavors. The resulting beans are crisp and lightly crunchy, thus having a desirable texture.

LENTIL

Whole green lentils are preconditioned in tap water until they reach a total hydration of 60.4% water, by weight. Six pounds of salt are placed in a rotatable pressure vessel with 480 pounds of preconditioned lentils. The vessel is closed and purged of air with live steam for approximately 5 minutes while rotating the vessel once each minute. The lentils are cooked in a live steam atmosphere at 15 psig for approximately 25 minutes. The vessel is rotated one third rotation each 5 minutes while the lentils are cooking. After cooking, the pressure is released, the lid opened, and the lentils dumped onto a conveyor belt.

The lentils are dehydrated by placing them onto a dehydration bed to a depth of approximately ½–¾ inch. An air velocity of approximately 800 fpm is utilized in three stages.

In the first stage, the air has a temperature of 225 degrees fahrenheit and is applied for a duration of approximately 24 minutes.

In the second stage, the air has a temperature 205 degrees fahrenheit and is applied for a duration of approximately 15 minutes.

In the third stage, the air has a temperature of approximately 175 degrees fahrenheit and is applied for a duration of approximately 18 minutes. Residual moisture in the lentils is approximately 6%. The resulting food product has a distinctive lentil flavor and is desirably crunchy when chewed.

Various other legumes can be made into similar snack food products. Those skilled in the art will recognize that legumes such as pinto beans, pink beans, red beans, black beans, navy beans, black eye beans, kidney beans, garbanzo beans, lentils and peas, among others, are likewise suitable. The precise cooking and dehydration methods utilized will depend upon the particular legume utilized.

It is understood that the exemplary leguminous snack food described herein and shown in the drawings represents only a presently preferred embodiment of the invention. Indeed, various modifications and additions may be made to such embodiment without departing from the spirit and scope of the invention. For example, various preconditioning and cooking times and conditions, i.e. temperatures, may be utilized. Thus, these and other modifications and additions may be obvious to those skilled in the art and may be implemented to adapt the present invention for use in a variety of different applications.

What is claimed is:

1. A process for preparing a leguminous snack food comprising the steps of:
   a) preconditioning legumes by soaking the legumes in water at a temperature of approximately 212 degrees fahrenheit such that the legumes are hydrated to a moisture content between 52% and 55%, by weight;
   b) next, cooking the legumes, the method for cooking the legumes chosen from the list consisting of:
      i) submerging the legumes in water and boiling the water at a pressure higher than ambient pressure;
      ii) disposing the legumes in a rotating vessel and heating the legumes with steam under pressure;
   c) next, cooling the legumes by immersing the legumes in water having a temperature of less than approximately 90 degrees fahrenheit;
   d) next, dehydrating the legumes at approximately ambient pressure by blowing moisture laden air thereover at a velocity of between approximately 500 and approximately 1,500 fpm and gradually lowering the temperature and relative humidity of the air blown thereover from an initial temperature of approximately 235 degrees fahrenheit and an initial relative humidity of approximately 50% to a final temperature of approximately 160 degrees fahrenheit and a final humidity of approximately 10% until the moisture content of the legumes is in the range of approximately 6% to 8%, by weight, so as to mitigate the problem of incurring a Maillard reaction;
   e) next, enrobing the legumes by binding the legumes with flavoring; and
   f) wherein the legumes are chosen from the list consisting of:
      i) pinto beans;
      ii) pink beans;
      iii) red beans;
      iv) black beans;
      v) navy beans;
      vi) black eye beans;
      vii) kidney beans;
      viii) garbanzo beans;
      ix) lentils; and
      x) peas.

* * * * *